(12) United States Patent
Lereya

(10) Patent No.: US 11,170,163 B2
(45) Date of Patent: Nov. 9, 2021

(54) DIGITAL PROCESSING SYSTEMS AND METHODS FOR AUTOMATIC RELATIONSHIP RECOGNITION IN TABLES OF COLLABORATIVE WORK SYSTEMS

(71) Applicant: MONDAY.COM, Tel Aviv (IL)

(72) Inventor: Daniel Lereya, Tel Aviv (IL)

(73) Assignee: MONDAY.COM, Tel Aviv (IL)

( * ) Notice: Subject to any disclaimer, the term of this patent is extended or adjusted under 35 U.S.C. 154(b) by 0 days.

(21) Appl. No.: 17/143,677

(22) Filed: Jan. 7, 2021

(65) Prior Publication Data

US 2021/0124872 A1    Apr. 29, 2021

Related U.S. Application Data

(63) Continuation of application No. PCT/IB2020/000658, filed on Aug. 7, 2020.

(60) Provisional application No. 63/019,396, filed on May 3, 2020, provisional application No. 63/018,593, filed on May 1, 2020, provisional application No.
(Continued)

(51) Int. Cl.
    *G06F 40/177*    (2020.01)
(52) U.S. Cl.
    CPC .................. *G06F 40/177* (2020.01)
(58) Field of Classification Search
    None
    See application file for complete search history.

(56) References Cited

U.S. PATENT DOCUMENTS

| | | | |
|---|---|---|---|
| 6,385,617 B1 * | 5/2002 | Malik | G06F 30/3323 |
| | | | 707/693 |
| 2007/0174760 A1 * | 7/2007 | Chamberlain | G06F 40/103 |
| | | | 715/220 |

(Continued)

FOREIGN PATENT DOCUMENTS

WO    WO 2004/100015 A2    11/2004

OTHER PUBLICATIONS

International Search Report in PCT/IB2020/000658, dated Nov. 11, 2020 (6 pages).

(Continued)

*Primary Examiner* — Howard Cortes
(74) *Attorney, Agent, or Firm* — Finnegan, Henderson, Farabow, Garrett & Dunner LLP

(57) ABSTRACT

Systems and methods include identifying a first column heading selection for a first column in a table and identifying a second column heading selection for a second column in a table; defining a column combination based on the identified first column heading selection and identified second column heading selection; analyzing predefined column heading combinations contained in a memory to determine when the defined column combination corresponds to a predefined column heading combination from among the predefined column heading combinations contained in the memory; associating a predefined logical combination rule with the first column and the second column in the table based on a determination that the defined column combination corresponds to the predefined column heading combination; monitoring entries in the first column and the second column for a triggering event when the predefined logical combination rule is triggered; and altering display in the table using the predefined logical combination rule.

23 Claims, 13 Drawing Sheets

Related U.S. Application Data

62/975,716, filed on Feb. 12, 2020, provisional application No. 62/961,547, filed on Jan. 15, 2020, provisional application No. 62/937,195, filed on Nov. 18, 2019, provisional application No. 62/884,402, filed on Aug. 8, 2019.

(56) References Cited

U.S. PATENT DOCUMENTS

| | | | | |
|---|---|---|---|---|
| 2008/0256014 | A1* | 10/2008 | Gould | G06F 8/10 706/48 |
| 2009/0006283 | A1* | 1/2009 | Labrie | G06F 16/215 706/12 |
| 2009/0276692 | A1* | 11/2009 | Rosner | G06F 40/177 715/227 |
| 2009/0313201 | A1* | 12/2009 | Huelsman | G06Q 10/06 706/47 |
| 2010/0228752 | A1* | 9/2010 | Folting | G06Q 10/10 707/758 |
| 2011/0066933 | A1* | 3/2011 | Ludwig | G06F 40/103 715/212 |
| 2011/0289439 | A1* | 11/2011 | Jugel | G06F 8/34 715/771 |
| 2013/0086460 | A1* | 4/2013 | Folting | G06F 9/44 715/212 |
| 2015/0095752 | A1* | 4/2015 | Studer | G06F 40/18 715/212 |
| 2015/0261796 | A1* | 9/2015 | Gould | G06F 16/215 707/694 |
| 2019/0050445 | A1* | 2/2019 | Griffith | G06F 16/213 |
| 2019/0361971 | A1* | 11/2019 | Zenger | G06F 16/288 |

OTHER PUBLICATIONS

Written Opinion of the International Searching Authority in PCT/IB2020/000658, dated Nov. 11, 2020 (6 pages).

* cited by examiner

| Project | Person | Task Details | Status | Due Date | Timeline |
|---|---|---|---|---|---|
| Task 1 | | | In Progress | July 4 | Jun 17 – Jul 4 |
| Task 2 | | | Waiting | July 31 | Jun 1 – Jul 31 |
| Task 3 | | | Done | July 25 | May 6 – Jul 25 |

| | Due Date 1 | | Due Date 2 | | Status |
|---|---|---|---|---|---|
| (!) | Jun 23 | ○ | Jun 26 | | In Progress |
| (!) | Jun 24 | ◐ | Jun 28 | | In Progress |
| ● | Jun 27 | ◑ | ~~Jun 30~~ | | In Progress |
| (✓) | ~~Jun 16~~ | (✓) | ~~Jun 13~~ | | Done |
| (✓) | ~~Jun 16~~ | (✓) | ~~Jun 29~~ | | Done |
| (✓) | ~~Jun 23~~ | (✓) | ~~Jun 26~~ | | Done |

1. If "Due Date 1" is met and "Status" is NOT yet "Done" Then add (!) to the cell containing the date.

2. If "Status" is "Done" Then add (✓) to cells containing dates in the row.

3. If "Due Date 2" is met and "Status" is NOT yet "Done" Then add (!) to the cell containing the date.

FIG. 8B

DIGITAL PROCESSING SYSTEMS AND METHODS FOR AUTOMATIC RELATIONSHIP RECOGNITION IN TABLES OF COLLABORATIVE WORK SYSTEMS

CROSS-REFERENCE TO RELATED APPLICATIONS

This application is a continuation of PCT International Application No. PCT/IB2020/000658, filed Aug. 7, 2020, which claims the benefit of priority of U.S. Provisional Patent Application No. 62/937,195, filed Nov. 18, 2019, U.S. Provisional Patent Application No. 62/961,547, filed Jan. 15, 2020, U.S. Provisional Patent Application No. 62/975,716, filed Feb. 12, 2020, U.S. Provisional Patent Application No. 63/018,593, filed May 1, 2020, and U.S. Provisional Patent Application No. 63/019,396, filed May 3, 2020, the contents of all of which are incorporated herein by reference in their entireties.

TECHNICAL FIELD

The present disclosure relates generally to column-oriented data structures and more particularly, to systems and methods thereof for collaborative work systems.

BACKGROUND

Operation of modern enterprises can be complicated and time consuming. In many cases, managing the operation of a single project requires integration of several employees, departments, and other resources of the entity. To manage the challenging operation, project management software applications may be used. Such software applications allow a user to organize, plan, and manage resources by providing project-related information in order to optimize the time and resources spent on each project. It would be useful to improve these software applications to increase operation management efficiency.

SUMMARY

This disclosure provides systems and methods for collaborative work systems. In an aspect, this disclosure provides for systems, methods, devices, and non-transitory computer readable mediums for relationship recognition in tablature. Systems, methods, devices, and non-transitory computer readable mediums may include at least one processor that is configured to identify a first column heading selection for a first column in a table and identifying a second column heading selection for a second column in the table; define a column combination based on the identified first column heading selection and identified second column heading selection; analyze a plurality of predefined column heading combinations contained in a memory to determine when the defined column combination corresponds to a predefined column heading combination from among the plurality of predefined column heading combinations contained in the memory; associate a predefined logical combination rule with the first column and the second column in the table based on a determination that the defined column combination corresponds to the predefined column heading combination; monitor entries in the first column and the second column for a triggering event when the predefined logical combination rule is triggered; and alter a display in the table using the predefined logical combination rule based on the triggering event.

BRIEF DESCRIPTION OF THE DRAWINGS

FIG. 7A illustrates an example of a table that presents two linked columns, consistent with embodiments of the present disclosure.

FIG. 8A illustrates an example of a table with linked data columns, consistent with embodiments of the present disclosure.

FIG. 8B illustrates an example user interface for configuring predefined logical combination rules, consistent with embodiments of the present disclosure.

DETAILED DESCRIPTION

Figure 1:
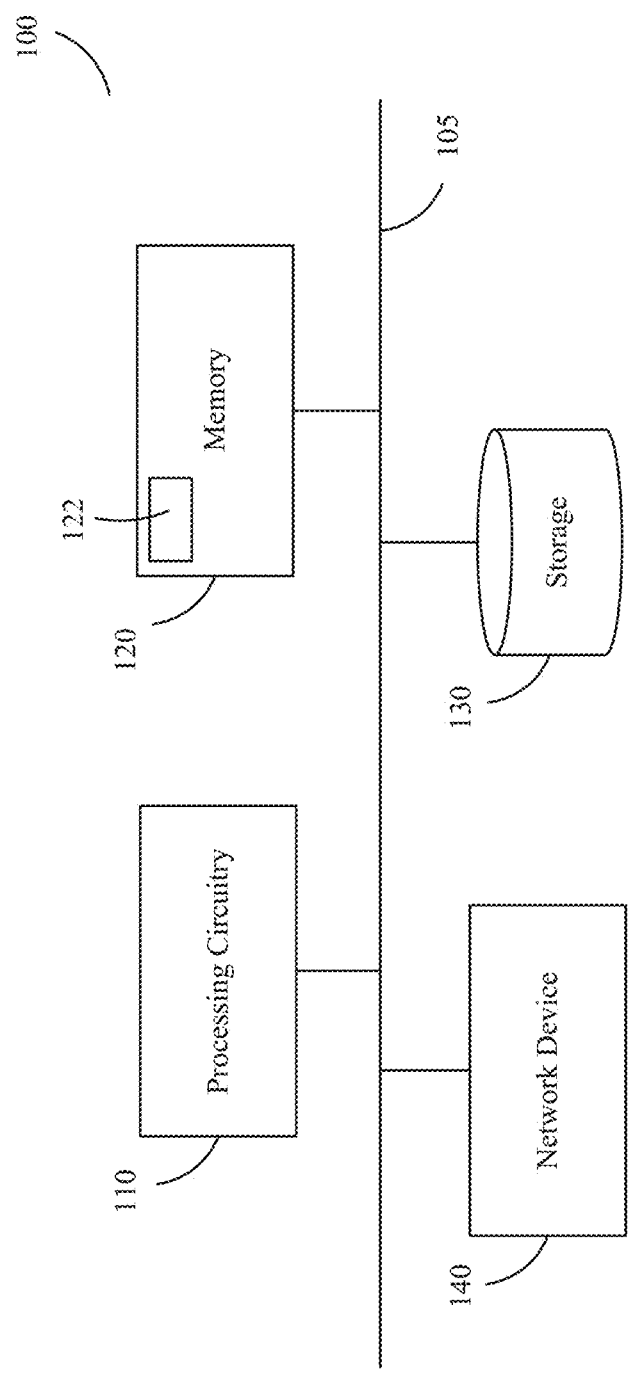
FIG. 1 is a block diagram of an exemplary computing device which may be employed in connection with embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise. Moreover, the relational terms herein such as "first" and "second" are used only to differentiate an entity or operation from another entity or operation, and do not require or imply any actual relationship or sequence between these entities or operations.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

In the following description, various working examples are provided for illustrative purposes. However, is to be understood the present disclosure may be practiced without one or more of these details.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

This disclosure is provided for the convenience of the reader to provide a basic understanding of a few exemplary embodiments and does not wholly define the breadth of the disclosure. This disclosure is not an extensive overview of all contemplated embodiments and is intended to neither identify key or critical elements of all embodiments nor to delineate the scope of any or all aspects. Its sole purpose is to present some features of one or more embodiments in a simplified form as a prelude to the more detailed description presented later. For convenience, the term "certain embodiments" or "exemplary embodiment" may be used herein to refer to a single embodiment or multiple embodiments of the disclosure.

Certain embodiments disclosed herein include devices, systems, and methods for collaborative work systems that may allow a user to interact with information in real time. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in the table. Boards may include sub-boards that may have a separate structure from a board. Sub-boards may be tables with sub-items that may be related to items of a board. Columns intersecting with rows of items may together define cells in which data associated with each item may be maintained. Each column may have a heading or label defining an associated datatype. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable mediums may be any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine comprising any suitable architecture.

Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single datatype for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single datatype column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
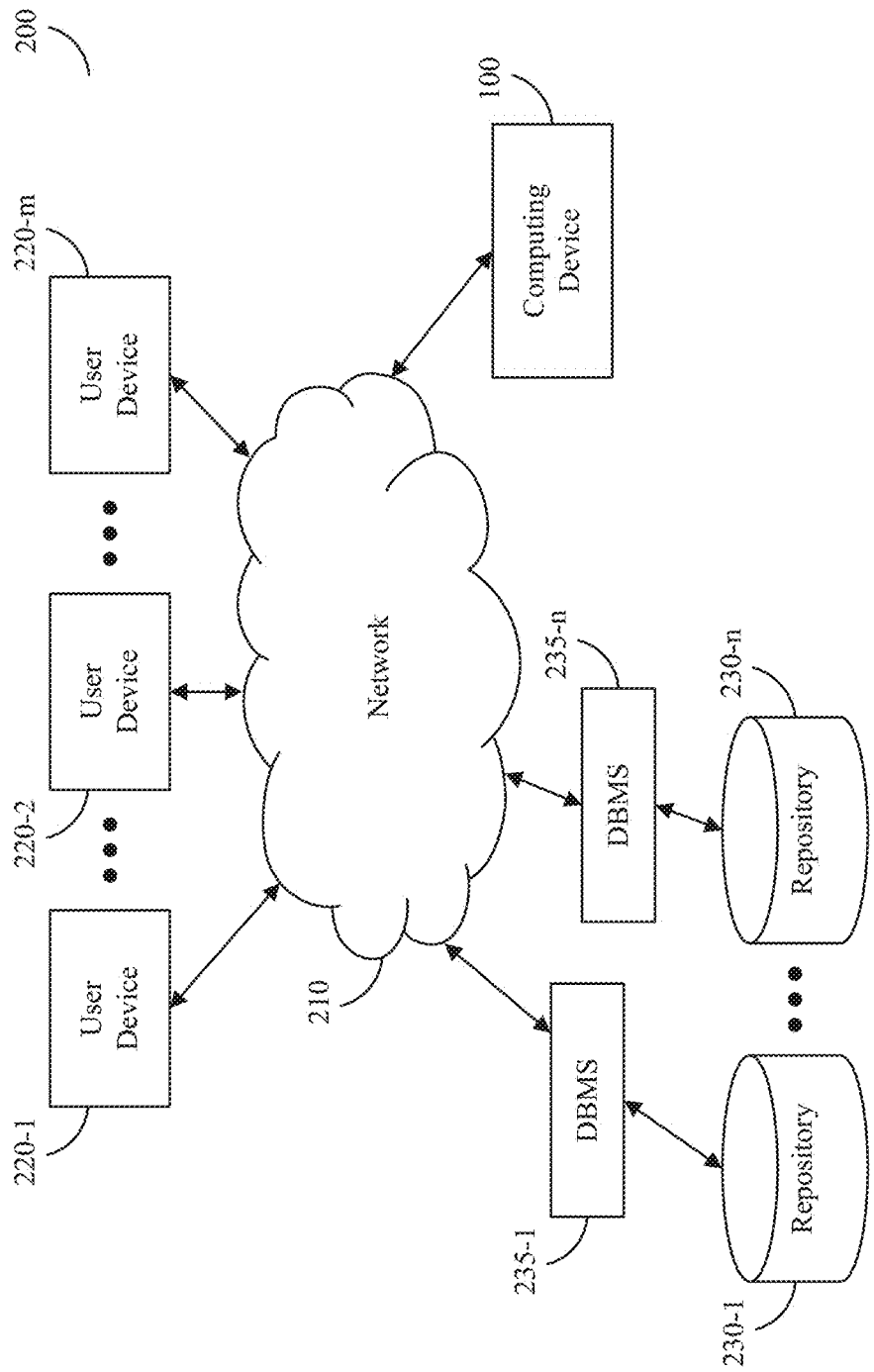
FIG. 2 is a block diagram of an exemplary computing architecture for collaborative work systems, consistent with embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-*m*, where 'm' in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single datatype column-oriented data structures, such as columns, rows, cells, schemas, and the like.

One or more data repositories 230-1 through data repository 230-*n*, where 'n' in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-*n*. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Aspects of this disclosure may provide a technical solution to the challenging technical problem of project management and may relate to a system for relationship recognition in tablature with the system having at least one processor in collaborative work systems, including methods, systems, devices, and computer-readable media. For ease of discussion, example methods are described below with the understanding that aspects of the example methods apply equally to systems, devices, and computer-readable media. For example, some aspects of such methods may be implemented by a computing device or software running thereon. The computing device can include at least one processor (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes can be executed by at least one processor. Non-transitory computer readable mediums, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

Tablature as used herein refers to any organized manner of displaying information in two dimensions, three dimensions, or more. A table having horizontal and vertical rows (e.g., rows and columns) may be one example of two-dimensional tablature. Tablature presented in greater than two dimensions may be simulated on a two-dimensional display or may be presented holographically or through virtual glasses or other virtual displays. Altering tablature displays, as used herein, may refer to any procedure or process of changing a visual presentation form of a display of a table in a collaborative work system. The procedures or processes for altering the tablature displays may involve, for example, any combination of modification, addition, or removal operated on a color, a font, a typeface, a shape, a size, a column-row arrangement, or any visual effect of a visible object in the table. The visible object may include a table cell, a table border line, a table header, or any table elements, and may further include a number, a text, a symbol, a mark, a character, a date, a time, an icon, an avatar, a hyperlink, a picture, a video, an animation, or any visible item included in any table element.

By way of one example, the collaborative work system may utilize workflow management software that enables members of a team to cooperate via a common online platform (e.g., a website). Aspects of this disclosure may display a table with items on a screen of a computing device. A table may be presented, for example, via a display screen associated with a computing device such as a PC, laptop, tablet, projector, cell phone, or personal wearable device. A table may also be presented virtually through AR or VR glasses. Other mechanism of presenting may also be used to enable a user to visually comprehend presented information. Aspects of this disclosure may enable a user (e.g., an individual operating the computing device) to establish a relationship between two columns of the table based on their column headings, may associate a logical rule with the two columns, and may monitor entries in the two columns and alter a display in the table when the logical rule is triggered.

Consistent with disclosed embodiments, at least one processor may carry out operations that may involve identifying a first column heading selection for a first column in a table. A user may be an individual or a portion of the general population. A "table" as used herein includes those items described earlier in connection with the term "tablature," and may include a form, a sheet, a grid, a list, or any data presentation in horizontal and vertical dimensions (e.g., horizontal rows and vertical columns, horizontal rows and vertical rows, or horizontal columns and vertical columns). The table may be presented on a screen of a computing device (e.g., a personal computer, a tablet computer, a smartphone, or any electronic device having a screen).

Figure 3A:
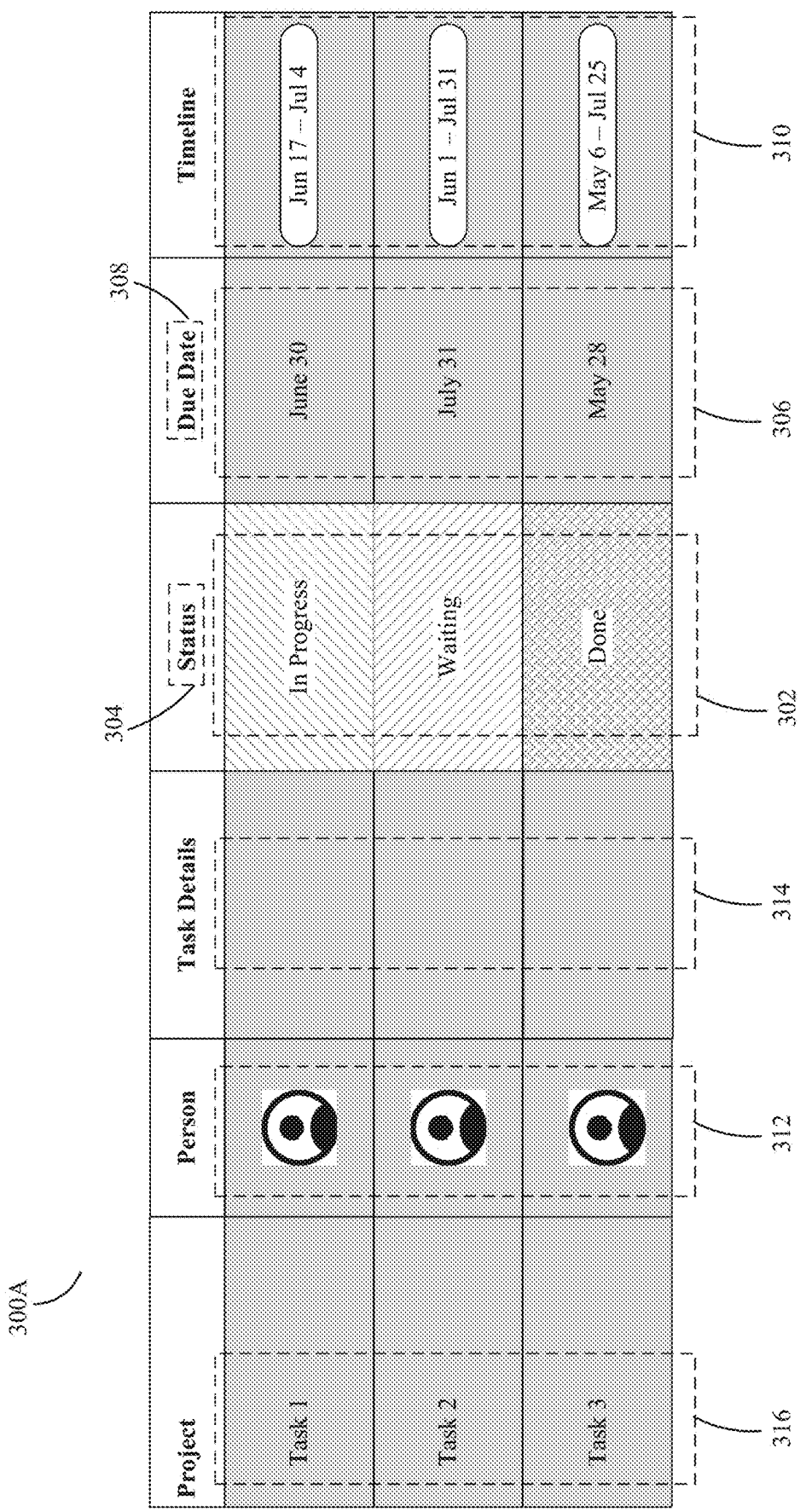
FIG. 3A illustrates an example of a table that includes multiple columns, consistent with embodiments of the present disclosure.

By way of example, FIG. 3A illustrates an example of a table 300A that includes multiple columns, consistent with embodiments of the present disclosure. In some embodiments, the table 300A may be displayed using a computing device (e.g., the computing device 100 illustrated in FIG. 1) or software running thereon. The table 300A may be associated with a project to display and may include, in the multiple columns, tasks included in the project, persons assigned to the tasks, details of the tasks, statuses of the tasks, due dates of the tasks, and timelines of the tasks. In FIG. 3A, the table 300A includes a first column 302 that has a first column heading 304 ("Status").

Any column of the table may display cells of a single datatype or of multiple datatypes. A single datatype column may be one where all cells are uniform in at least one aspect or characteristic. The characteristic may be numeric values only, characters only, alphanumeric values, graphic elements only, closed lists of elements, formatting, a specific value range, or any constraint on the format or type of column data. In some embodiments, the first column may be at least a portion of a single datatype (e.g., texts) column-oriented data structure. A single datatype column-oriented data structure may be a digital data structure of a table that includes columns where all cells of the columns may be programmed to include a single category of data.

For example, in FIG. 3A, a first column 302 may be a status column type of table 300A. Other columns with other characteristics in FIG. 3A include a due date column type (including a second column 306), a timeline column type (including a column 310), a person column type (including a column 312), and text column types such as columns 314 and 316.

In some embodiments, a computing device that implements the operations may provide a user interface that includes an interactive element for identifying a first column heading selection. Identifying may occur in a computing device in response to a user selection of a column or column heading. Upon the user selection, the column heading may be identified as a column by the computing device. The user interface may be a web page, a mobile-application interface, a software interface, or any graphical interface that enables interactions between a human and a machine. The user interface may include, in some embodiments, a column store where a user may select from a plurality of different column types to add to a table. The interactive element included in the user interface may be, for example, a mouse cursor, a touchable area (as on a touchscreen), an application program interface (API) that receives a keyboard input, or any hardware or software component that can receive user inputs. Column headings may be associated with each of the columns or rows within a table. The column heading may be a default text or may be customized by a user. The user may select (e.g., using a mouse cursor) a first column heading on the user interface displayed on the user device to add to the user's table, and the user's selection may be transferred over the network back to the computing device. The column heading may be a default in the user interface such as in a column store, but in response to a user selection, the column type associated with the column heading may be added to the table where the user may then customize the default column heading. The column heading may also be selected in a table if the column has already been added to the table.

In some embodiments, the computing device (e.g., the computing device 100 in FIG. 2) may provide the user interface (e.g., a web page or a column store) to a user device (e.g., any of the user device 220-1, 220-2, or 220-*m* in FIG. 2) over a network (e.g., the network 210 in FIG. 2). The user may select the first column heading 304 on the user interface displayed on the user device, such as a column store, and add a column type associated with the first column heading into the table such as in table 300A in FIG. 3A, and the user's selection may be transferred over the network 210 back to the computing device 100 and may be displayed on the user device 220-1, 220-2, or 220-*m* as shown in FIG. 2.

Figure 3B:
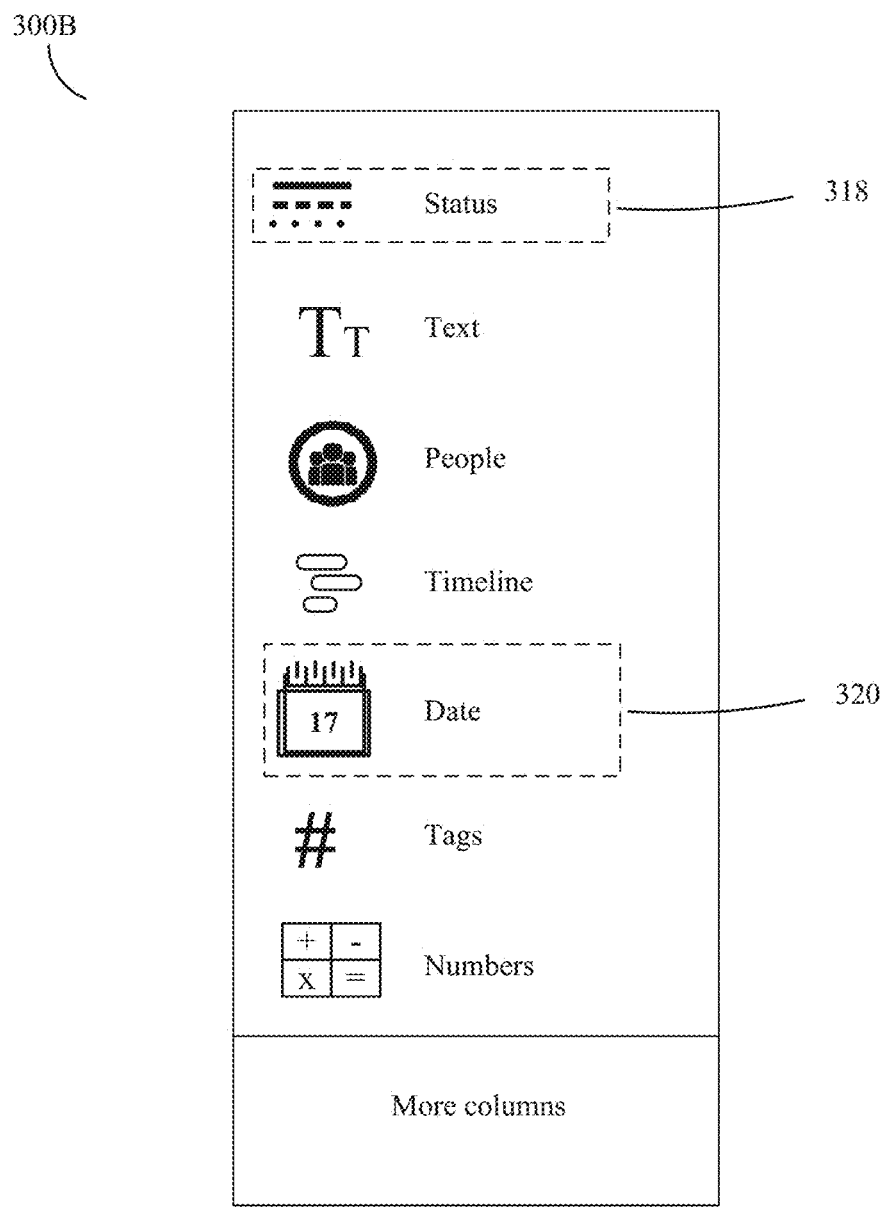
FIG. 3B illustrates an example of a user interface that enables selecting a column, consistent with embodiments of the present disclosure.

In some embodiments, the user interface provided by the computing device may enable the user to select the first column heading automatically. By way of example, FIG. 3B illustrates an example of a user interface 300B that enables selecting a column, consistent with embodiments of the present disclosure. For example, the user interface 300B may be a menu (e.g., a context menu) that may be prompted in response to a user input (e.g., a click or a finger tap on a button associated with the table). The generation of the user interface 300B may be achieved by an application running on the computing device (e.g., the computing device 100 in FIGS. 1-2). The application may generate a user interface (e.g., the user interface 300B) for rendering on a display of a user device (e.g., the user device 220-1, 220-2, or 220-*m* in FIG. 2). The user device may interact with the user interface using one or more physical elements (e.g., a mouse, a touchscreen, a touchpad, a keyboard, or any input/output device) that are associated with the user device. In response to receiving inputs from the physical elements, the application may generate and render the user interface on the display of the user device.

By way of example, in FIG. 3B, the user interface 300B may include multiple selection items corresponding to different operations or functions for adding columns, including a command 318 ("Status") and a command 320 ("Date"). The user interface 300B may receive a user selection of the one or more of the selection items. For example, the user selection may be received by a click through one or more of the selection items. In some embodiments, if the user invokes the user interface 300B and selects the command 318, the computing device may insert a new column of a status datatype to the table and automatically select its column heading without user intervention. In some embodiments, if the user invokes the user interface 300B and selects the command 320, the computing device may insert a new column of a date datatype to the table and automatically select its column heading without user intervention.

Consistent with disclosed embodiments, the operations may also involve identifying a second column heading selection for a second column in the table. Identifying may occur in a computing device in response to a user selection of a column or column heading as described herein. Upon the user selection, the column heading may be identified as a column by the computing device. In some embodiments, the second column may include data of a datatype different from the datatype of data in the first column as described herein. For example, if the first column is a status datatype, then the second column that is selected may be a date datatype. The second column may also be added to the table by selecting a column type in a column store by selection a second column heading in the column store or user interface. The second column may then be added to the user's table which may have a second default column heading that may then be later customized by a user as described herein. If the second column has already been added to the table, the user may also select the second column heading directly in the table.

By way of example, in FIG. 3A, the table 300A includes a second column 306 that has a second column heading 308 ("Due Date"). In FIG. 3A, the first column 302 includes three rows, each row including one or more words indicative of a status of each task of the project. The second column 306 includes three rows, each row including a date indicative of a due date of each task of the project. In some embodiments, the computing device that implements the method may enable the user to select the second column heading in the table or through a user interface such as a column store in a manner similar to that of enabling the user to select the first column heading in the table as described above.

In some embodiments, the computing device may enable the user to select the second column heading for the second column (e.g., the second column 306) from the same table where the first column (e.g., the first column 302) is selected from. In response to the user selection, the computing device may identify the second column. In some embodiments, although not illustrated in FIG. 3A, the computing device may identify a second column heading by enabling the user to select the second column heading for the second column from a table different from the table where the first column is selected from. In a broadest sense, the computing device may enable the user to select the first column heading and the second column heading for the first column and the second column, respectively, from any table or tables to which the user has access.

In some embodiments, the first column and the second column may be presented next to each other, such as the first column 302 and the second column 306 in FIG. 3A. In some embodiments, the first column and the second column may be separate from each other. For example, the first column and the second column may be selected from different tables. In another example as shown in FIG. 8A, a first column could be Due Date 1 column 810 and a second column could be Status column 830. It should be noted that the first and second columns may be selected in various ways in the table if the columns have been added or through a user interface such as a column store to add new columns into a table, and this disclosure does not limit such implementations to the examples described herein.

In some embodiments, the computing device may provide a user interface to enable the user to select the second column heading automatically such that the computing device may identify a second column. With reference to FIG. 3B for example, the user interface 300B includes the command 318 and the command 320. In some embodiments, when the user invokes the user interface 300B and selects the command 318, the computing device may insert a first new column of a status datatype to the table and automatically select its column heading without user intervention. Then, when the user invokes the user interface 300B and selects the command 320, the computing device may insert a second new column of a date datatype to the table and automatically select its column heading without user intervention. By doing so, the computing device may enable the user to automatically select the first column heading and the second column heading.

Consistent with disclosed embodiments, the at least one processor may further be configured to define a column combination based on the identified first column heading selection and identified second column heading selection. Defining a column combination may include associating, in any way, two or more columns. Defining a combination may include, for example, causing to be stored in memory an association between two or more columns. The association may take the form of a link between columns and/or may include a code, designator, or indicator associating two or more columns with each other. A column combination may include a combination of any types of columns and any number of columns. By selecting a column heading or any part of that column heading's column, that particular column associated with the column heading may also be selected. By selecting column headings, the computing device may identify and select particular columns in order to define a column combination. For example, a computing device may identify a first column heading selection in response to a user selection of a first column heading such as "Status." The computing may identify a second column heading selection in response to a user selection of a second column heading such as "Date." By identifying both first and second column heading selections, the computing device may define a column combination of both the "Status" and "Date" columns.

Consistent with disclosed embodiments, the at least one processor may be configured to analyze a plurality of predefined column heading combinations contained in a memory to determine when the defined column combination corresponds to a predefined combination from among the plurality of predefined column heading combinations contained in the memory. "Analyzing," as used herein, may include processes or procedures of examining, determining, or checking differences or similarities between aspects of two objects (e.g., computer data objects). When the two objects are computer data objects, the aspects may include, for example, contents (e.g., numeric values, character values, or any data value), datatypes, formats, quantities, or any characteristic of the two objects. As an example, when the two objects are computer data objects (e.g., two sets of structured data), the analyzing may be implemented as processes or procedures of examining or checking bits (e.g., binary bits) of the two computer data objects to determining their differences or similarities of their contents or datatypes. Analyzing may occur in response to a selection of two columns or may occur upon the entry of a column into a table.

The defined column combination may include an implementation of a specific combined group of data, such as a pair of textual strings stored in a computer memory or a combined group of columns as described herein. The defined column combination may be a result of a manual selection within a table or may be a combination of a newly added column to a table that may contain a preexisting column within the table to perform a lookup of different combinations that may be stored in a computer memory. The predefined column heading combinations may be predetermined combinations of column headings, such as predetermined pairs of textual strings that include combinations of various column headings stored in the computer memory. To determine when the defined column combination corresponds to one of the predefined column heading combinations, the computing device may determine that the defined column combination corresponds to the predefined column heading combination if the analysis indicates that the defined column combination is the same (e.g., having the same value or the same datatype) as the predefined column heading combination, and may determine that the defined column combination does not correspond to the predefined column heading combination if determined otherwise. In response to determining that a defined column combination corresponds to one of the predefined column heading combinations, the system may alter a display of a default column heading to provide additional meaningful data.

By way of example, in FIG. 3A, the defined column combination of the first column heading 304 and the second column heading 308 may be implemented as a pair of datatypes, in which the first column heading 304 may be associated with a datatype of status (e.g., "in progress," waiting," "done," or "delayed"), the second column heading 308 may be associated with a datatype of dates, and the pair may be represented as a defined column combination of "datatype of status and datatype of dates." If one of the predefined column heading combinations is also a combination of "datatype of status, and datatype of dates," then the computing device may determine that the defined column combination corresponds to the predefined column heading combination. In response to determining that the defined column combination of columns corresponds to one of the predefined column heading combinations, the system may alter the display of a default "Date" column heading for a date column with a different column heading such as "Due Date" in the second column heading 308 to indicate additional information that the data in the second column 306 are related to due dates.

Consistent with disclosed embodiments, the computing device may execute operations that may further involve associating a predefined logical combination rule with the first column and the second column in the table upon determination that the defined column combination corresponds to a predefined combination contained in the memory. "Associating," as used in this context, may refer to processes or procedures of establishing a relationship or connection between at least one thing and at least one other thing. The relationship or connection may be established by linking the two or more things, or by assigning a common code, address, or other designation to the two or more things. In this example, the two or more things may be a column combination on the one hand and a predefined logical rule on the other. The relationship or connection may be implemented as a data structure stored in a memory. For example, if the plurality of objects are data objects stored in the memory, associating them may be implemented as processes or procedures to link them or represent them using a data structure (e.g., members of a single class). In some embodiments, at least one of the plurality of data objects or columns may store an indicator (e.g., a flag, a pointer, or a shading) for representing that specific data object(s) are associated in some way.

The predefined logical combination rule may represent an operation predetermined to be performed whenever an associated combination of columns is identified. The logical combination rule may take the form of an If-Then statement (e.g., if the combination of column A occurs with column B in a common table or within related tables, then perform C.) In addition to or as an alternative to an If-Then the logical combination rule may employ connectives such as OR, XOR, NOT, or AND, or any logical expression. In some embodiments, the rule may be implemented as program codes or as logical combination statements containing no-code as described herein. By associating the predefined logical combination rule with a first column and a second column, the first column and second column become related according to the relationship defined by the predefined logical combination rule. For example, a predefined logical combination rule may be stored in memory for a defined column combination such as a status column and a date column. This predefined logical combination rule may include a relationship such as comparing value entries in a status column with value entries in a date column against a current date such that if the value entry in the status column is anything other than "Done" beyond a specific date, an overdue indication is presented. Upon recognition of a defined column combination of status and date columns in a table, this predefined logical combination rule may then be associated with these particular columns of the defined column combination in the table as is discussed below.

Logical combination rules may apply to any column type and may apply to an infinite number of combinations of columns of any column type, such as a Task column, a Person column, a Date column, a Contact column, a Time Tracking column, a Location column, a World Clock column, a File column, or any other column type associated with the table. The types and number of columns that may be subject to a predefined logical combination rule, and the action initiated as a result of that rule are limitless. The table below presents a few additional non-limiting examples of actions triggered by conditions in at least two columns (of course, actions can be triggered by conditions in more than two columns).

| First Column | Second Column | Predefined Logical Combination Rule |
|---|---|---|
| Person | Hours | If Person's Hours exceed a threshold, notify a specific person |
| Hours | Hourly budget | If total Hours exceed the Hourly Budget, change color of cell |
| Budget ($) | Amount Invested | If Amount Invested exceeds Budget send SMS to controller |

| First Column | Second Column | Predefined Logical Combination Rule |
| --- | --- | --- |
| Unit Volume Sales | Monthly Forecast | If Unit Volume Sales is less than 50% of Monthly forecast by mid month, send email containing specific text to sales team |
| Sales Amount | Person | If Sales Amount for any Person exceeds $500,000 in a month, add Person to President's Club Board |
| Person | Hours of Tasks Assigned | If Hours of Tasks Assigned for any Person exceeds 160 hours in a prospective four weeks, re-assign an associated task to another |
| Time Zone | Video Call | If a Notification is slated for transmission to a Time Zone where the current time is between 1 am and 5 am, disable Video Call |
| GPS Location | Assigned Destination | If a driver is at an Assigned Destination at an Assigned time, determine from driver's GPS Location an expected time of arrival, and notify a supervisor |
| Current Commodity Price | Target Commodity Price | If a Current Commodity Price derived from a third-party application falls below a Target Commodity Price, place an order with a vendor for 500 shares |

Using FIG. 3A as a nonlimiting example, when the computing device determines that the defined column combination of the first column heading 304 and the second column heading 308 correspond to a predefined combination of (datatype of status, datatype of dates) contained in a memory 120 as shown in FIG. 1, the computing device may associate a predefined logical combination rule with the defined column combination by storing the predefined logical combination rule with or between the particular columns of the defined column combination in the memory such that when data is altered in one column, the predefined logical combination rule may be executed to alter data or create new data in the other column. For example, the predefined logical combination rule may cause the computing device to perform an operation (e.g., altering the display in the table) when a task (e.g., task 1, task 2, or task 3) is overdue, determined based on a current date, the status of a task in the first column 302, and a due date in the second column 306.

In some embodiments, the predefined logical combination rule between the first column and second column is enabled to be altered. Enabling the rule to be altered may include for example, providing an interface that allows a user to change parameters of the rule. For example, a user may be enabled to alter a predefined logical combination rule by deleting and replacing the predefined logical combination rule, or changing an existing predefined logical combination rule to alter operations and/or to implicate other columns. The predefined logical combination rules may be displayed and may be altered in any location such as in a board, in a dashboard view, in a widget, or any other location described herein.

Figure 4A:
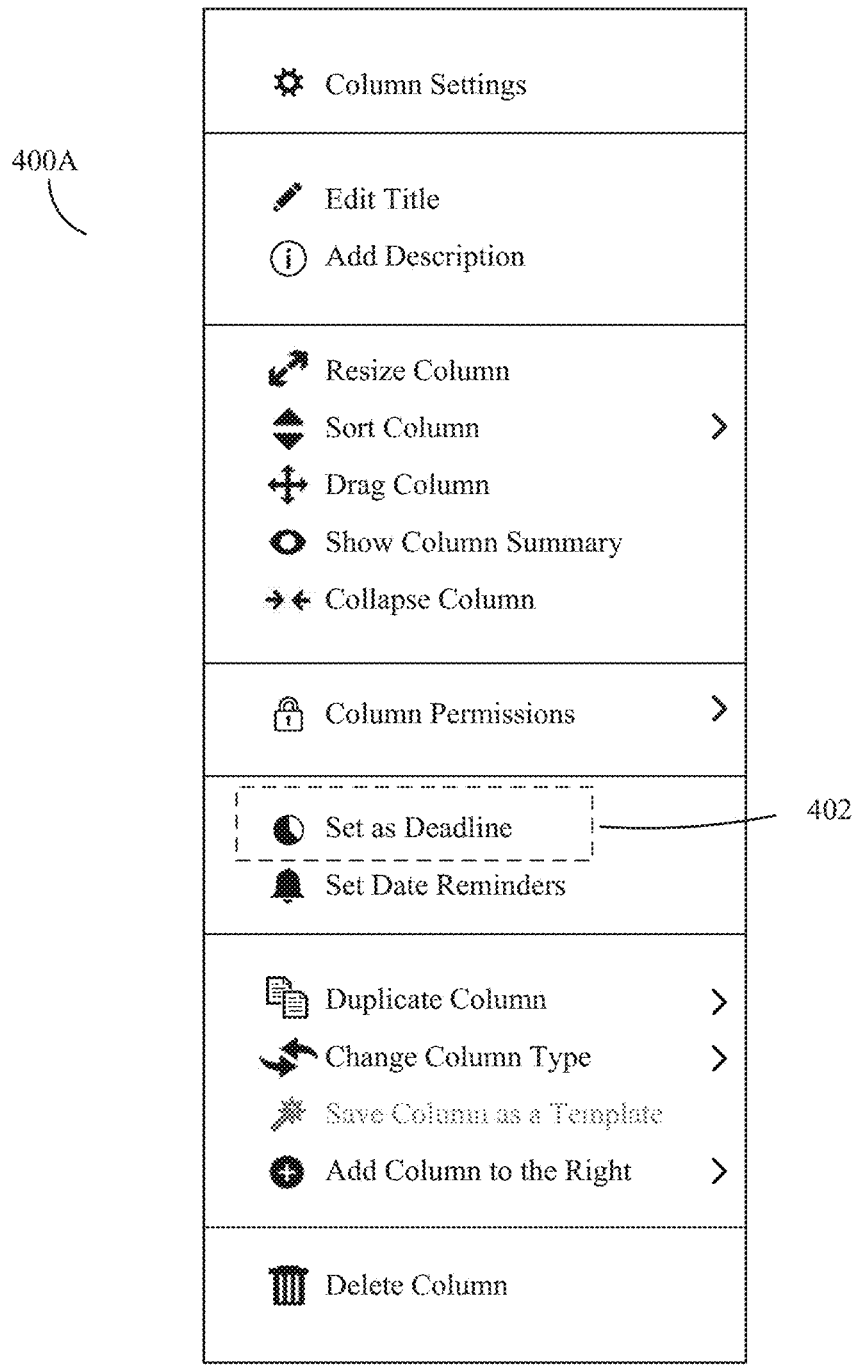
FIG. 4A illustrates an example of a user interface that enables altering a predefined logical combination rule, consistent with embodiments of the present disclosure.

FIG. 4A illustrates an example of a user interface 400A that enables altering a predetermined logical combination rule, consistent with embodiments of the present disclosure. For example, the user interface 400A may be a menu (e.g., a context menu) that may be prompted in response to the selection of specific columns in a table or in response to adding new columns to a table. The generation of the user interface 400A may be achieved by an application running on the computing device (e.g., the computing device 100 in FIGS. 1-2). The application may generate a user interface (e.g., the user interface 400A) for rendering on a display of a user device (e.g., the user device 220-1, 220-2, or 220-m in FIG. 2). The user device may interact with the user interface using one or more physical elements (e.g., a mouse, a touchscreen, a touchpad, a keyboard, or any input/output device) that are associated with the user device. In response to receiving inputs from the physical elements, the application may generate and render the user interface on the display of the user device.

For example, the computing device may generate a web page which may be retrieved by the user device and rendered for display thereon. The web page may include the table (e.g., the table 300A in FIG. 3A). The user may interact with the table by, for example, scrolling through the table (e.g. displaying different rows of data), clicking on a cell of a column to update or input data therein, or any combination of any interaction. When the user interacts with the table, the user interface 400A may be invoked by a user operation. As an example, the user may be enabled to invoke the user interface 400A by selecting (e.g., using an on-screen cursor, or applying a finger tap on a touchscreen) a column heading (e.g., the first column heading 304 or the second column heading 308 in FIG. 3A) of the table 300A and click a mouse button (e.g., a "right click"). In response to the selection of a column heading, the computer system may then identify a column heading selection.

By way of example, in FIG. 4A, the user interface 400A may include multiple selection items corresponding to different operations or functions associated with the selected column, including a command 402 ("Set as Deadline"). The user interface 400A may receive a user selection of the one or more of the selection items for the computing system to identify column heading selections. For example, the user selection may be received by a click through one or more of the selection items. It should be noted that the user may select more than one selection items at a time. In some embodiments, if the user invokes the user interface 400A with respect to the first column heading 304 or the second column heading 308 in FIG. 3A and selects the command 402, the computing device may be enabled to alter the predefined logical combination rule between the first and second columns.

Figure 4B:
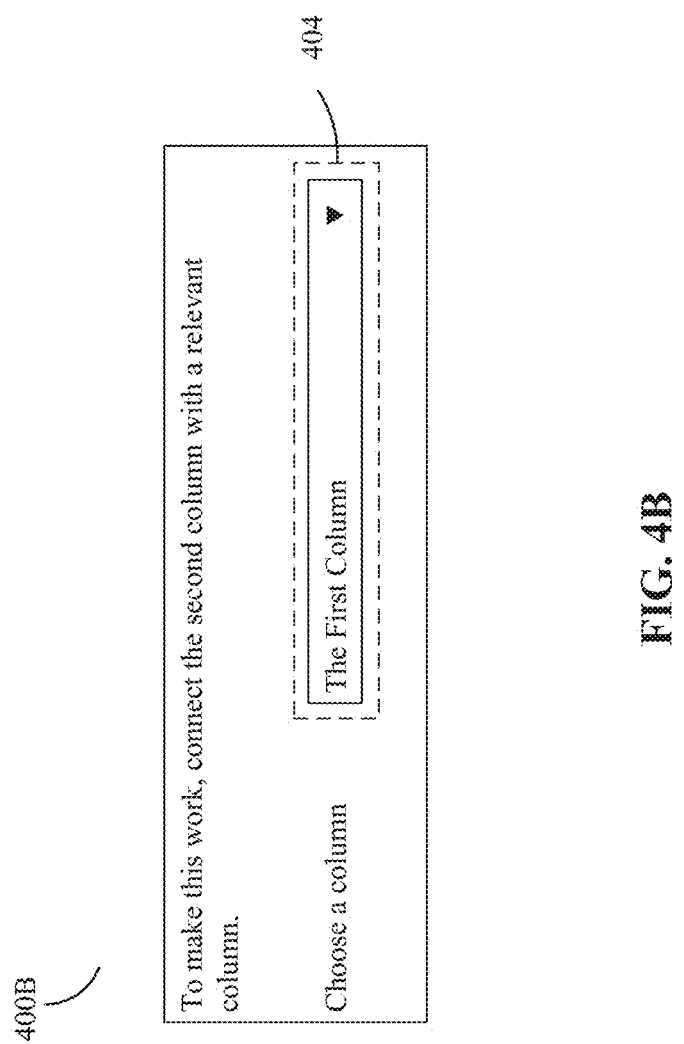
FIG. 4B illustrates an example of another user interface that enables altering a predefined logical combination rule, consistent with embodiments of the present disclosure.

FIG. 4B illustrates an example of another user interface 400B that enables altering a predetermined logical combination rule, consistent with embodiments of the present disclosure. For example, the user interface 400B may be a pop-up window after the user selects the command 402 as illustrated in FIG. 4A. The user interface 400B includes an interactive item 404. By way of example, the interactive item 404 in FIG. 4B may be a drop-down menu. As an example, if the user invokes the user interface 400A in FIG. 4A with respect to the second column heading 308 and selects the command 402, the user interface 400B may prompt the user to select a relevant column, such as the first column 302 in FIG. 3A or any column that has been associated with (e.g., forming a defined column combination of) the second column 306. If the user selects the first column in the user interface 400A, for example, then the computing device may alter (e.g., creating or redefining a preexisting rule) the predefined logical combination rule between the first column and second columns.

Figure 4C:
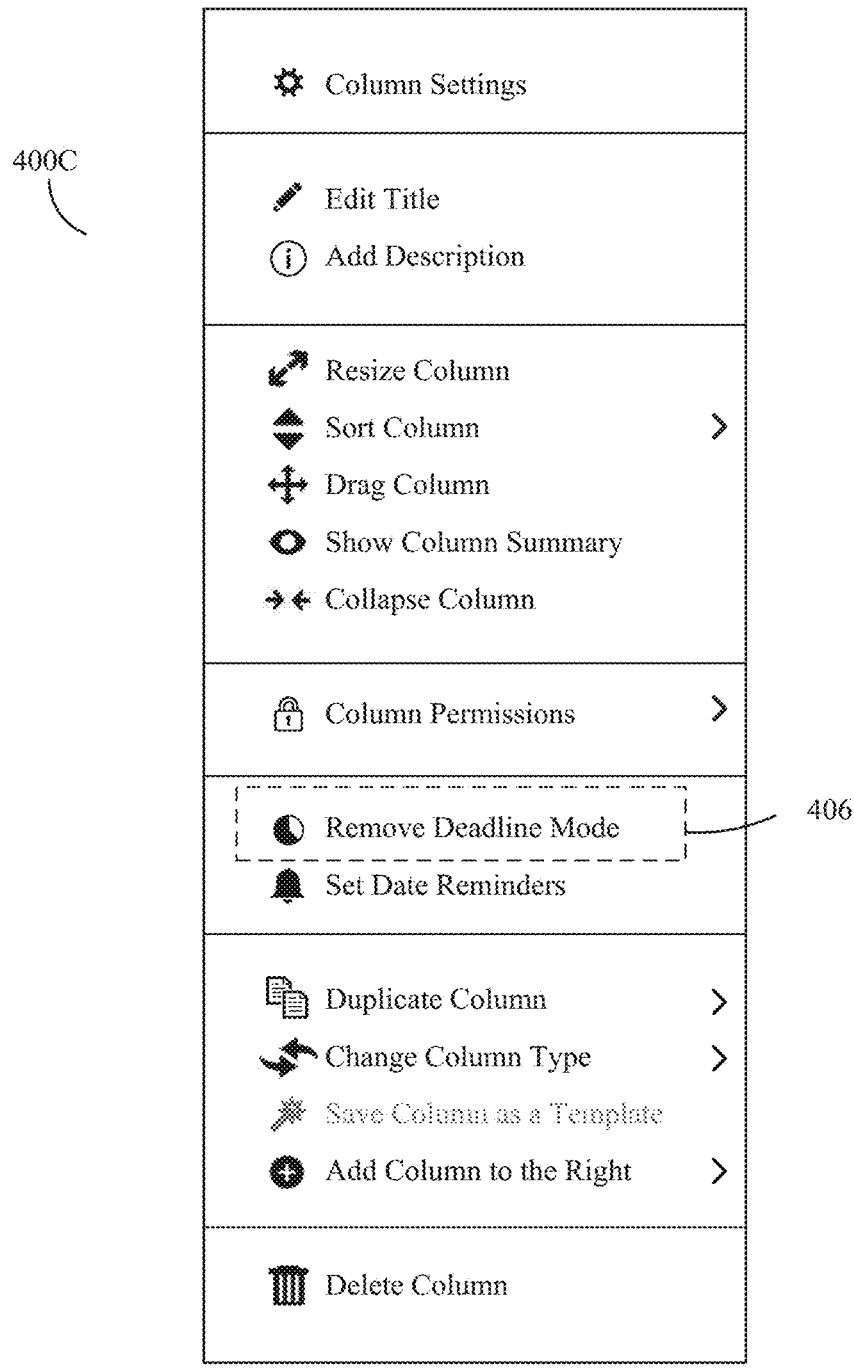
FIG. 4C illustrates an example of a user interface that enables cancelling a predefined logical combination rule, consistent with embodiments of the present disclosure.

In some embodiments, after creation of the predefined logical combination rule, the predefined logical combination rule is enabled to be cancelled. Enabling cancellation may involve presenting to a user an interface where cancelling may occur. "Cancelling," as used herein, may refer to processes or procedures of removing, deleting, destroying, erasing, nullifying, negating, or any manner of neutralizing effectiveness of a rule or a command. FIG. 4C illustrates an example of a user interface 400C that enables to cancel a predetermined logical combination rule, consistent with embodiments of the present disclosure. For example, the user interface 400C may be a menu (e.g., a context menu). In some embodiments, if the table 300A is displayed on a web page, similar to the user interface 400A, the user may be enabled to invoke the user interface 400C by selecting a column heading of the table 300A and click a mouse button.

By way of example, similar to the user interface 400A in FIG. 4A, the user interface 400C includes multiple selection items, including a command 406 ("Remove Deadline Mode"). In some embodiments, if the user invokes the user interface 400C with respect to the second column heading 308 that is associated with the first column heading 304 in FIG. 3A and selects the command 406, the computing device may enable the user to cancel the predefined logical combination rule, such as deleting the predefined logical combination rule between the first column and second columns.

Consistent with disclosed embodiments, at least one processor may be configured to monitor entries in the first column and the second column for a triggering event when the predefined logical combination rule is triggered. Monitoring, as used herein, may refer to processes or procedures of inspecting, checking, or keeping track of statuses or changes of an object. For example, if the object is a computer data object stored in the memory, monitoring the computer data object may be implemented as inspecting it (e.g., continuously or periodically) to determine whether there is any change in the memory space where it is stored. The entries in the first column and the second column may be contents of the cells thereof. Monitoring may further include monitoring the entries in the first column and the second column as they have been related by a predefined logical combination rule to determine whether the predefined logical combination rule has been triggered. The triggering event may include a situation where the conditions of the predefined logical combination rule have been satisfied. The "triggering," as used herein, may refer to invoking a rule to be implemented when the condition of the rule is satisfied and may be defined as a triggering event.

By way of example, in FIG. 3A, the entries of the first column 302 includes statuses "in progress," "waiting," and "done," and the entries of the second column 306 includes dates "June 30," "July 31," and "May 28."

As an example, when the predefined logical combination rule states that the computing device will perform an operation when an item or task (e.g., task 1, task 2, or task 3) is overdue determined based on a current date, a due date, and a status of the task, the computing device may monitor the statuses in the first column 302 and the dates in the second column 306. If a current date passes a due date and the corresponding status is not "done," the computing device may determine that the predefined logical combination rule is triggered. In such a manner, the computing device may have monitored the first column and the second column for a triggering event as a result of the predefined logical combination rule being invoked.

Consistent with disclosed embodiments, at least one processor may be further configured to alter a display in the table using the predefined logical combination rule based on the triggering event. Altering as used herein, may refer to processes or procedures of modifying, adding, removing, or any way of changing an object. The "display" in the table may include a visual representation in the table as described herein. In some embodiments, the display of the table may be altered by one or more of adding or changing data in the table, changing a visual effect of a visual object in the table, adding a visual object or indication to the table. The visual effect may include a change in a color, a font, a typeface, a strikethrough, a shape, a size, a column-row arrangement, or any characteristic in visual presentation. The visual object may include a table cell, a table border line, a table header, or any table elements, and may further include a number, a text, a symbol, a mark, a character, a date, a time, an icon, an avatar, a hyperlink, a picture, a video, an animation, or any visible item included in any table element.

In some embodiments, the predefined logical combination rule may be configured to trigger a display change in the table in response to two differing value entries in two differing columns. A display change may include the addition, subtraction, or modification of data of the cells in the column or the column heading. Value entries may include the data or value entry contained in each of the cells associated with a column or row. Columns with different characterizations such as a status column and a date column may contain differing values associated with a specific item or column. The predefined logical combination rule may be triggered when specific values in each column meet a threshold, such as when an item's status is "In Progress" and the current date is after the specific date in the "Due Date" because this is a threshold that indicates that the item is overdue. As a result, a predefined logical combination rule that is triggered may alter a display of data in the table to indicate that the specific item is overdue by adding an overdue indication through text, graphics, or shading within one of the existing columns or by adding a new column of data to indicate the overdue indicator as described herein.

For example, in FIG. 3A, the two differing columns may be the first column 302 that include statuses and the second column 306 that include due dates. The two differing value entries may be a value entry (e.g., representing a status) in the first column 302 and a value entry (e.g., representing a date) in the second column 306. Based on the first column 302 and the second column 306, the computing device may determine whether an item or task (e.g., task 1, task 2, or task 3) is overdue on a current date. For example, if the current date is past a due date but a status of the task is not "done," the computing device may determine that the task is overdue. In some embodiments, the predefined logical combination rule may trigger a display change in the table when the task is overdue.

In some embodiments, the computing device may alter the display in the table by establishing a third column for storing data associated with a trigger of the predefined logical combination rule. Establishing a third column may include creating a new, independent column within a table, or may include presenting new information within the first or second columns in a table.

Figures 5A, 5B, 5C:
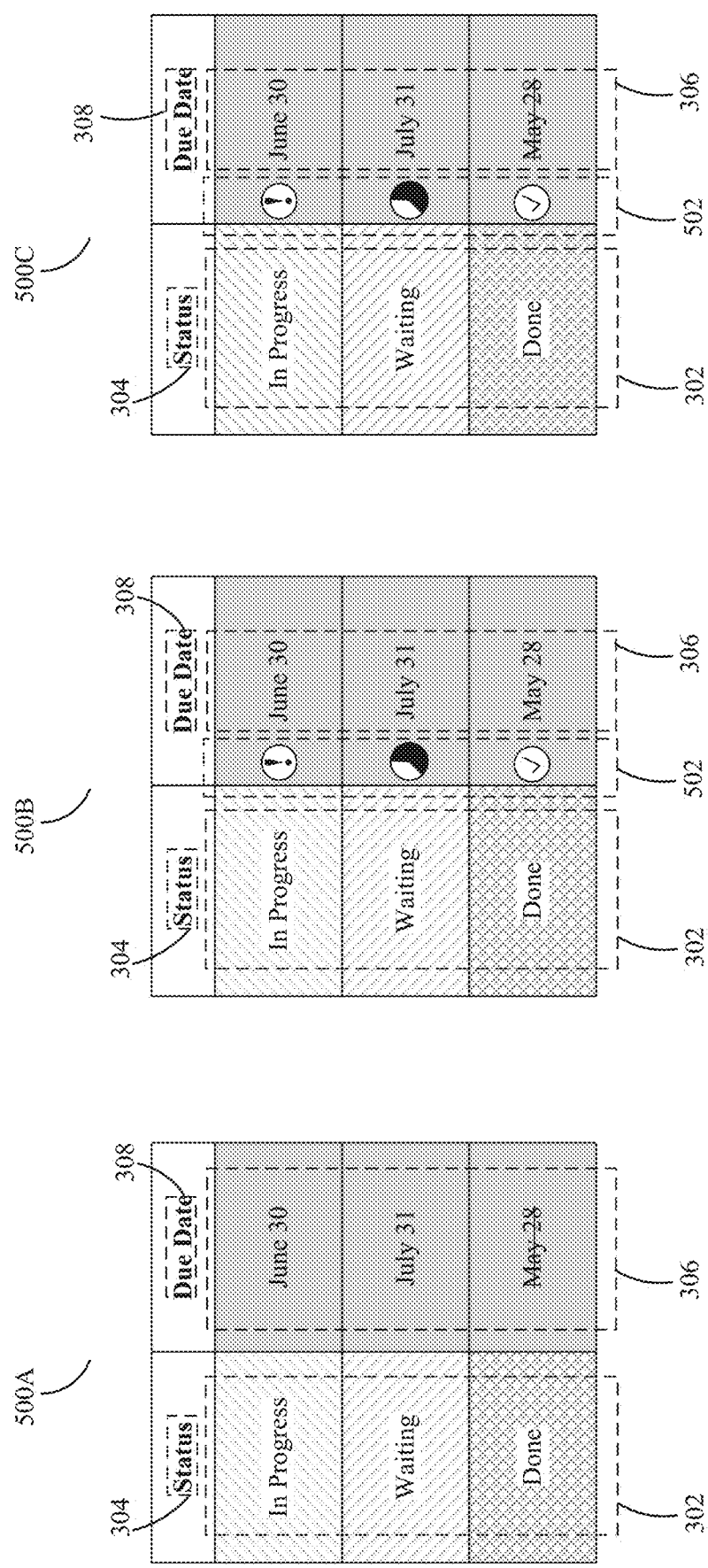
FIG. 5A illustrates an example of a table with an altered display, consistent with embodiments of the present disclosure.
FIG. 5B illustrates an example of a table with another altered display, consistent with embodiments of the present disclosure.
FIG. 5C illustrates an example of a table with yet another altered display, consistent with embodiments of the present disclosure.

By way of example, as shown in FIGS. 5B and 5C, the computer device may establish a third column 502 for storing data (e.g., the symbols included in the third column 502) associated with a trigger of the predefined logical combination rule. For example, the trigger may be that "a task is overdue" and present an exclamation mark as a graphical indicator of a task being overdue. In other logical combination rules, the trigger may result in an indicator that graphically presents the remaining time for a task, an indicator that a task is done, or any other graphical, alphanumeric, or combination of graphical and alphanumeric indication regarding the item or task. In some embodiments, the third column may be established as an independent column (e.g., added as a new column of the table). In some embodiments, the third column may be established as a part of another column, such as the third column 502 being a part of the second column 306 in FIGS. 5B and 5C.

In some embodiments, the computing device may alter the display in the table by altering a display of the second column. Altering the display of the second column may include altering the presentation of data in the cells of the second column or may include altering the display of the column heading. In some embodiments, the computing device may alter the display of the second column by changing a visual effect of a visual object in the table as described herein. Altering a display may include any change of display described herein.

By way of example, FIG. 5A illustrates an example of a table 500A with an altered display, consistent with embodiments of the present disclosure. The table 500A may be a part of the table 300A in FIG. 3A. As an example, in FIG. 5A, the current date may be July 20, and the table 500A indicate that task 1 has a due date on June 30 with a status "in progress" (i.e., task 1 is overdue), task 2 has a due date on July 31 with a status "waiting" (i.e., task 2 is not overdue), and task 3 has a due date on May 28 with a status "done." As shown in FIG. 5A, the computing device may alter the display in the table by altering the display of the second column 306, such as by changing a visual effect (e.g., adding a strikethrough line) of a visual object (e.g., the texts "May 28") to indicate that task 3 is completed in time.

In some embodiments, the computing device may alter the display of the second column by adding a visual object to the second column. By way of example, FIG. 5B illustrates an example of a table 500B with an altered display, consistent with embodiments of the present disclosure. The table 500B may be similar the table 500A in FIG. 5A. Compared with the table 500A, in FIG. 5B, the computing device may alter the display of the second column 306 by adding visual objects (e.g., a check-mark symbol near the text "May 28," a clock-like symbol near the text "July 31," and an exclamation-mark symbol near the text "June 30," respectively) to indicate that task 3 is completed in time, that task 2 is neither completed nor overdue, and that task 1 is overdue, respectively.

In some embodiments, the computing device may alter the display of the second column by changing a visual effect of a visual object in the table and adding a visual object to the table. By way of example, FIG. 5C illustrates an example of a table 500C with an altered display, consistent with embodiments of the present disclosure. The table 500C may be similar the table 500A in FIG. 5A and the table 500B in FIG. 5B. In FIG. 5C, the computing device may alter the display of the second column 306 by applying both the display changes in the tables 500A and 500B, in which a strikethrough line is added to the text "May 28," and symbols are added as the third column 502 to the table.

In some embodiments, the computing device may alter the display in the table by altering a display of the first column and a display of the second column. The altering of a display of a first column may include altering of the presentation of data in the cells of the column or a presentation of the display of the column heading as described herein in other exemplary embodiments. Altering may further include altering the display of a second column in a similar manner.

For example, the first column and the second column may be the first column 302 and the second column 306 in FIG. 3A, respectively. In such cases, the computing device may alter the display of the first column by changing a background color of a cell in the first column, changing a text in the cell of the first column to be bold, adding a symbol or a mark to the cell of the first column, or any combined operation of changing a visual effect of a visual object in the first column or adding a visual object to the first column. The computing device may alter the display of the second column (e.g., in the manners as described in FIGS. 5A to 5C). As another example, the first column and the second column may be the third column 502 and the second column 306 in FIGS. 5B and 5C, respectively. In such cases, the computing device may alter the display of the first and second columns in a manner as described in FIGS. 5B to 5C.

In some embodiments, the computing device may alter the display in the table by displaying an aggregation of entries in the first column and the second column where the predefined logical combination rule is triggered. Displaying an aggregation of entries may include displaying summary information that is representative of data contained within each of the columns such that specific data may be represented as a proportion of all of the data contained within each column. Such displaying of an aggregation of entries may be presented in any graphical manner such as a bar or with any alphanumeric text such that it presents a summary indication of the data contained in each column. The summary information may also be presented as a combination of both graphical and alphanumeric indications.

Figure 6:
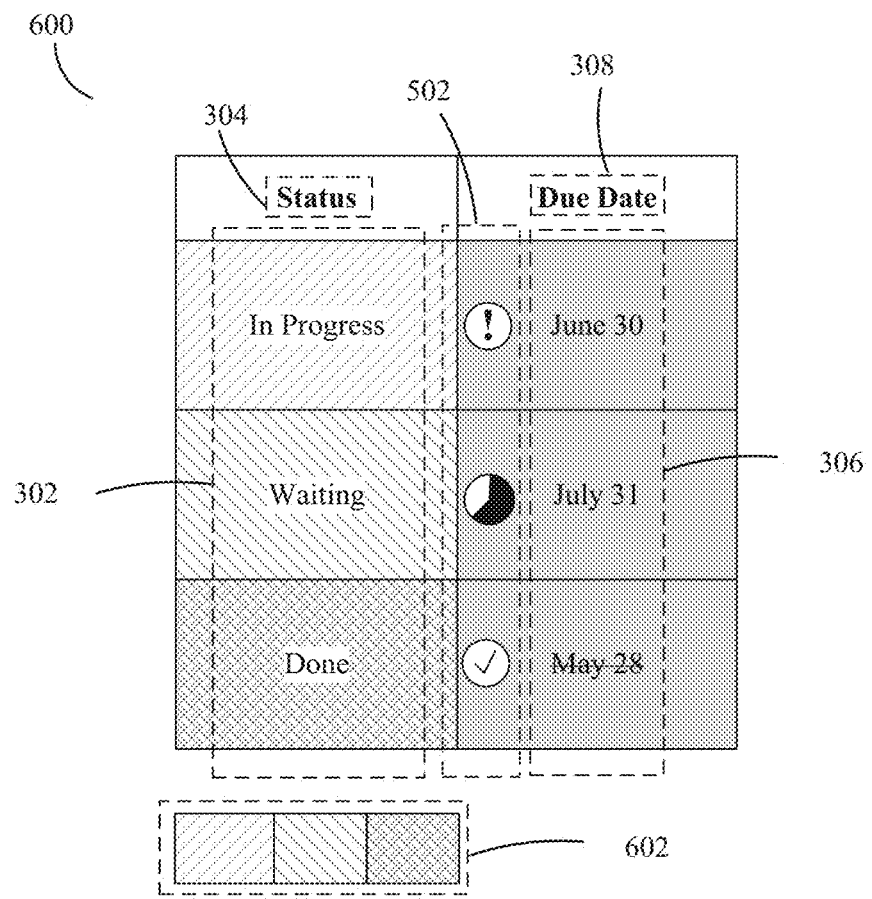
FIG. 6 illustrates an example of a table with an aggregation of entries, consistent with embodiments of the present disclosure.

By way of example, FIG. 6 illustrates an example of a table 600 with an aggregation of entries, consistent with embodiments of the present disclosure. The table 600 may be similar to the table 500C in FIG. 5C. The table 600 includes the first column 302 and the second column 306 where the predefined logical combination rule is triggered. For example, the predefined logical combination rule may trigger a display change (e.g., adding a strikethrough line to the text "May 28" and the third column 502) in the table when a task is overdue.

The aggregation of entries may be any summary indicator of the data contained in the columns through a graphical indication such as a bar, a circle, a pie chart, or any alphanumeric indication such as fractions or any visible collection indicative or combination of both graphical and alphanumeric indications of the entries. By way of example, in FIG. 6, the aggregation may be an aggregation 602 that is a bar chart. The aggregation 602 may correspond to the first column 302 for displaying a summary graphical information of the statuses of all tasks labeled (e.g., indicated by a text) in the first column 302. In FIG. 6, the aggregation 602 is displayed under the first column 302.

By way of example, in FIG. 6, the aggregation 602 is divided into portions. The number of the divided portions of the aggregation 602 may correspond to the number of the tasks, such as three as illustrated in FIG. 6. The portions of the aggregation 602 may display patterns or colors corresponding to or the same as the patterns or colors of the cells in the first column 302, respectively. For example, in FIG. 6, the cell associated with task 1 with the status "in progress," the cell associated with task 2 with the status "waiting," and the cell associated with task 3 with the status "done" in the first column 302 may have a first shaded patter, a second shaded pattern, and a dotted pattern in the background, respectively. Correspondingly, the aggregation 602 may have three portions having the first shaded patter, the second shaded pattern, and the dotted pattern, respectively. In such a way, the aggregation 602 may perceivably display the number of different statuses of the tasks in the project.

In some embodiments, the length of the divided portions of the aggregation 602 may be proportional to the number of their corresponding statuses in the first column 302 as a proportion to the total number of status entries within the column. As an example, in FIG. 6, the first column 302 displays three status types, each status type including one status. Accordingly, the number of statuses in each status type takes up one third of the total number of statuses in FIG. 6. Correspondingly, the aggregation 602 may display one third of length of the first shaded pattern, one third of length of the second shaded pattern, and one third of length of the dotted pattern to represent such a relationship of the status types.

In some embodiments, the computing device may alter the display of the first column and the display of the second column by presenting an indication that the first column and the second column are linked. Presenting an indication may include any graphical or alphanumeric indication as described herein. For example, graphical indicators may include icons, symbols, colors, shadings, or any other non-alphanumeric indications. Alphanumeric indications may include indicators such text, numbers, fractions, or any other non-graphical indicators. Presenting an indication may also include a combination of both graphical and alphanumeric indicators.

By way of example, FIG. 7A illustrates an example of a table 700A that presents two linked columns through a graphical indicator such as color or shading, consistent with embodiments of the present disclosure. The table 700A may be similar to the table 300A in FIG. 3A. In FIG. 7A, the computing device may present the indication that the first column 302 and the second column 306 are linked by changing a background color (e.g., from white to gray) of the first column heading 304 and the second column heading 308.

Figure 7B:
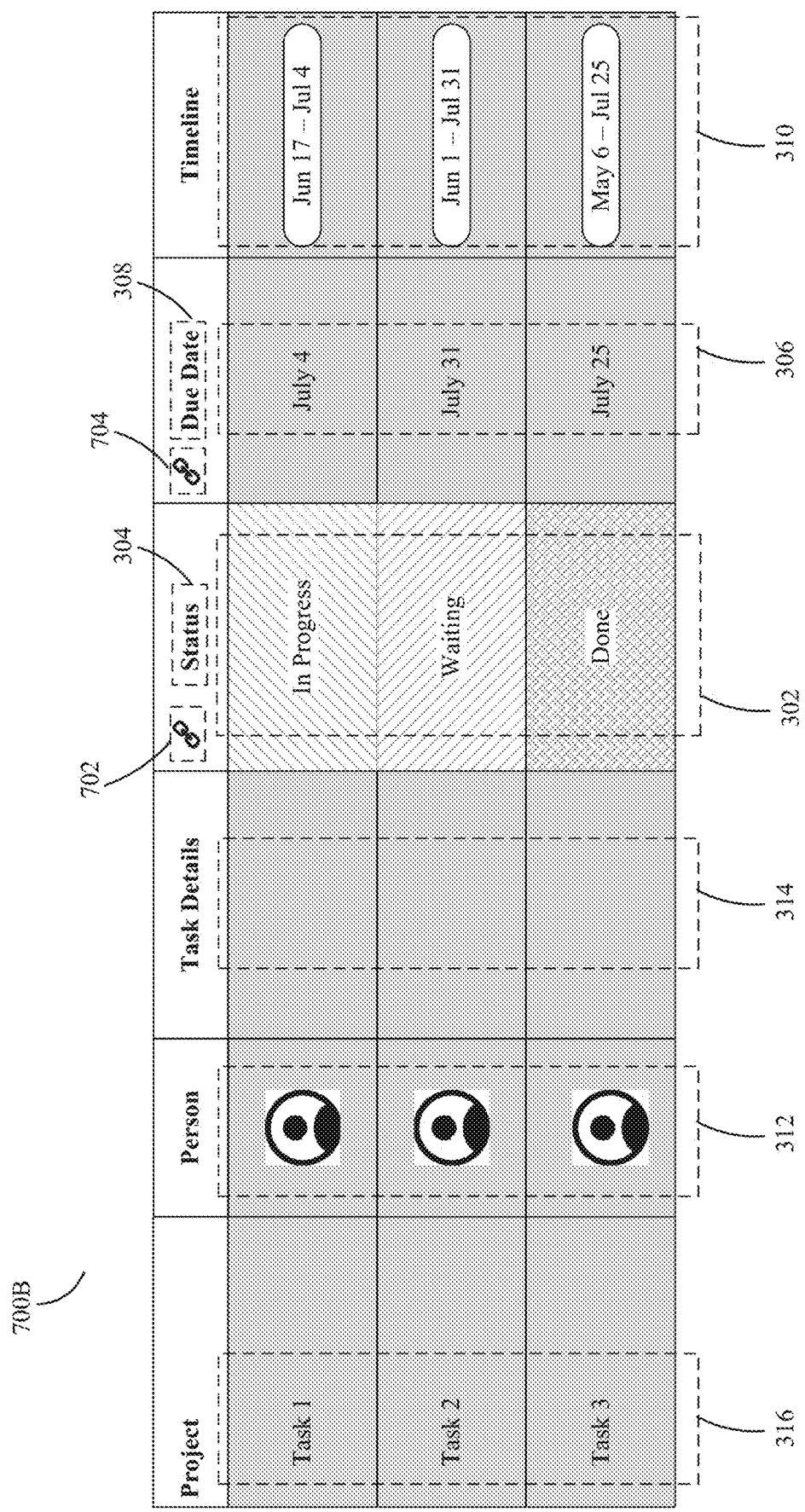
FIG. 7B illustrates another example of a table that presents two linked columns, consistent with embodiments of the present disclosure.

In some embodiments, the indication is graphical such as an icon. By way of example, FIG. 7B illustrates another example of a table 700B that presents two linked columns, consistent with embodiments of the present disclosure. The table 700B may also be similar to the table 300A in FIG. 3A. In FIG. 7B, the computing device may present the indication that the first column 302 and the second column 306 are linked by adding to display a first icon 702 near the first column heading 304 and a second icon 704 near the second column heading 308.

In some embodiments, the computing device may present the indication that the first column 302 and the second column 306 are linked by presenting a plurality or combination of indications, including the indications as described in FIGS. 7A and 7B. It should be noted that the display of the first column and the display of the second column may be altered by various manners of presenting indications, and this disclosure does not limit such manners to the example embodiments described herein.

In some embodiments, after presenting an indication that the first column and the second column are linked, the computing device may automatically determine whether to maintain the indication after one of the column types or column headings has been updated. The processor may be configured to further execute operations that include enabling replacement of the identified first column heading for the first column with an updated column heading for the first column. By replacing the column heading or column type, the system may then analyze the updated column heading or updated column type with the predefined column heading combinations as previously executed and described herein. Replacement of a column heading may include substituting, modifying, adding, or subtracting from the preexisting column heading. Presenting may include displaying in any manner as described herein. Indications may include any indicator such as graphical, alphanumeric, or a combination thereof as described herein.

In some embodiments, the computing device may replace with an updated heading (not shown) the first column heading (e.g., the first column heading 304 in FIGS. 7A to 7B) for the first column (e.g., the first column 302 in FIGS. 7A to 7B). For example, the updated column heading may provide for different content (e.g., different texts or values) or a different datatype, column type, or format compared to the first column heading. In some embodiments, the computing device may provide a user interface (not shown), such as a menu, to enable the user to replace the first column heading with a selection from a plurality of different column headings or column types. For example, if the table is displayed on a web page, the user may click on the first column heading to invoke the user interface for replacing it.

After enabling replacement the first column heading, the computing device may analyze a plurality of predefined column heading combinations contained in the memory to determine when the updated defined column combination corresponds to a predefined column heading combination from among the plurality of predefined column heading combinations contained in the memory. In some embodiments, the analyzing of the updated defined column combination with the predefined column heading combinations may be implemented in a way similar to analyzing the defined combination of the first column heading and the second column heading with the predefined column heading combinations contained in the memory to determine when the defined column combination corresponds to a predefined combination contained in the memory, as described herein, the details of which will not be repeated hereinafter.

After analyzing the updated combination with the predefined column heading combinations, the computing device may disassociate the predefined logical combination rule with the first column and the second column in the table upon determination that the updated defined combination does not correspond to any predefined combination contained in the memory. "Dissociating," as used herein, may refer to processes or procedures of decoupling, separating, or breaking up associated objects. For example, if the predefined logical combination rule is dissociated with the first column and the second column, the computing device will no longer apply the predefined logical combination rule to either of the first column and the second column.

After dissociating the predefined logical combination rule with the first column and the second column, the computing device may further alter the display in the table including unlinking the first column and the second column. In some embodiments, the computer device may further alter the display in the table to unlink the first column and the second column by removing the indication that the first column and the second column are linked.

Using FIG. 7A as an example, the computing device may remove the indication by changing the color (e.g., from gray to white) of the first column heading 304 and the second column heading 308. Using FIG. 7B as an example, the computing device may remove the indication by removing from display the first icon 702 and the second icon 704.

In some embodiments, the computing device may send a notification when the predefined logical combination rule is triggered. The notification may include an email, a text message, a phone call, an application push notification, a prompt, or any combination of any form of notifications. The notification may be sent, for example, to an email address, a phone number, a mobile application interface, within the application, or any combination of any device or user interface to which the user has access. By doing so, in some exemplary embodiments, the user may be notified of the statuses of the tasks of a project in real time.

For example, the predefined logical combination rule may state that, when a task (e.g., task 3 as illustrated in FIG. 3A) is overdue, not only a display a change (e.g., adding a strikethrough line to the text "May 28" and the third column 502, as shown in FIG. 5C) but also send a notification to a particular person or persons. Consistent with embodiments of the present disclosure, a computing device (e.g., the computing device 100) may alter the display of a table in accordance with one or more established rules. In some embodiments, such rules may be configured automatically. In some embodiments, such rules may be configurable by a user in manners described herein.

By way of example, FIG. 8A illustrates an example of a table 800A with associated data columns, consistent with embodiments of the present disclosure. The table 800A includes seven rows (including a row of column headings) and three columns 810 (representing a first due date of tasks of a project), 820 (representing a second due date of the tasks), and 830 (representing a status of the tasks), which include cells. In FIG. 8A, all cells of each column (except the cells in the column headings) may include data of a single datatype. In some embodiment, some of the columns may be of the same datatype. For example, in FIG. 8A, all cells of the column 810 are of a first datatype (e.g., dates), all cells of the column 820 are of a second datatype (e.g., dates), and all cells of the Status column 830 are of a third datatype (e.g., texts). In FIG. 8A, the columns 810, 820, and 830 are associated with one or more predefined logical combination rules, as indicated by the chain-like symbols in their cells of column headings.

Consistent with embodiments of the present disclosure, the computing device may enable the user to configure the one or more predefined logical combination rules or templates associated with the columns 810, 820, and 830. By way of example, FIG. 8B illustrates an example user interface 800B for configuring predefined logical combination rules, consistent with embodiments of the present disclosure. For example, the user interface 800B may be a pop-up window. In some embodiments, the user interface 800B may be invoked by a user selection of another user interface (e.g., a menu) associated with a table (e.g., the table 800A).

The user interface 800B includes multiple logical combination rules, including rules 1, 2, and 3. With reference to a row 840 of FIG. 8A, as an example, rule 1 states that when a status of a task (e.g., the task associated with the row 840) is not "done" and its Due Date 1 (e.g., June 24) is already crossed, the computing device may automatically add a first symbol (e.g., a circled exclamation symbol) to a cell (e.g., the cell 850) that contains its Due Date 1 for indicating that the task is overdue. As another example, a default rule (not shown in FIG. 8B) may state that when the status of the task (e.g., the task associated with the row 840) is "in progress" and its Due Date 2 (e.g., June 28) is not yet crossed, the computing device may automatically add a second symbol (e.g., a clock-like symbol) to a cell (e.g., the cell 860) that contains its Due Date 2 for indicating that the task is in progress.

In some embodiments, with reference to FIG. 8B, the user interface 800B may enable the user to configure the predefined logical combination rules by selecting one or more of the rules 1, 2, and 3. The selected rule may be automatically applied by the computing device to alter the display of the table 800A based the conditions stated in the selected rules.

In some embodiments, the user interface 800B may enable the user to configure parameters of the rules. By way of example, the parameters of the rules 1, 2, and 3 may include the column headings (e.g., "Due Date 1," "Due Date 2," and "Status") that provide inputs and implement outputs of the rules. The parameters of the rules 1, 2, and 3 may also include logical operands (e.g., AND, OR, NOT, or any logical operand) that associate the inputs of the rules. The parameters of the rules 1, 2, and 3 may further include operations the computing device will perform. such as adding symbols to a designated location of the table. The user interface 800B may enable the user to change, add, or remove any of the parameters to configure the rules. In some embodiments, the user interface 800B may further enable the user to add an entirely new rule or delete an existing rule. It should be noted that various implementations may be used to enable the user to configure the predefined logical combination rules, and this disclosure does not limit those implementations to the examples described herein.

Figure 9:
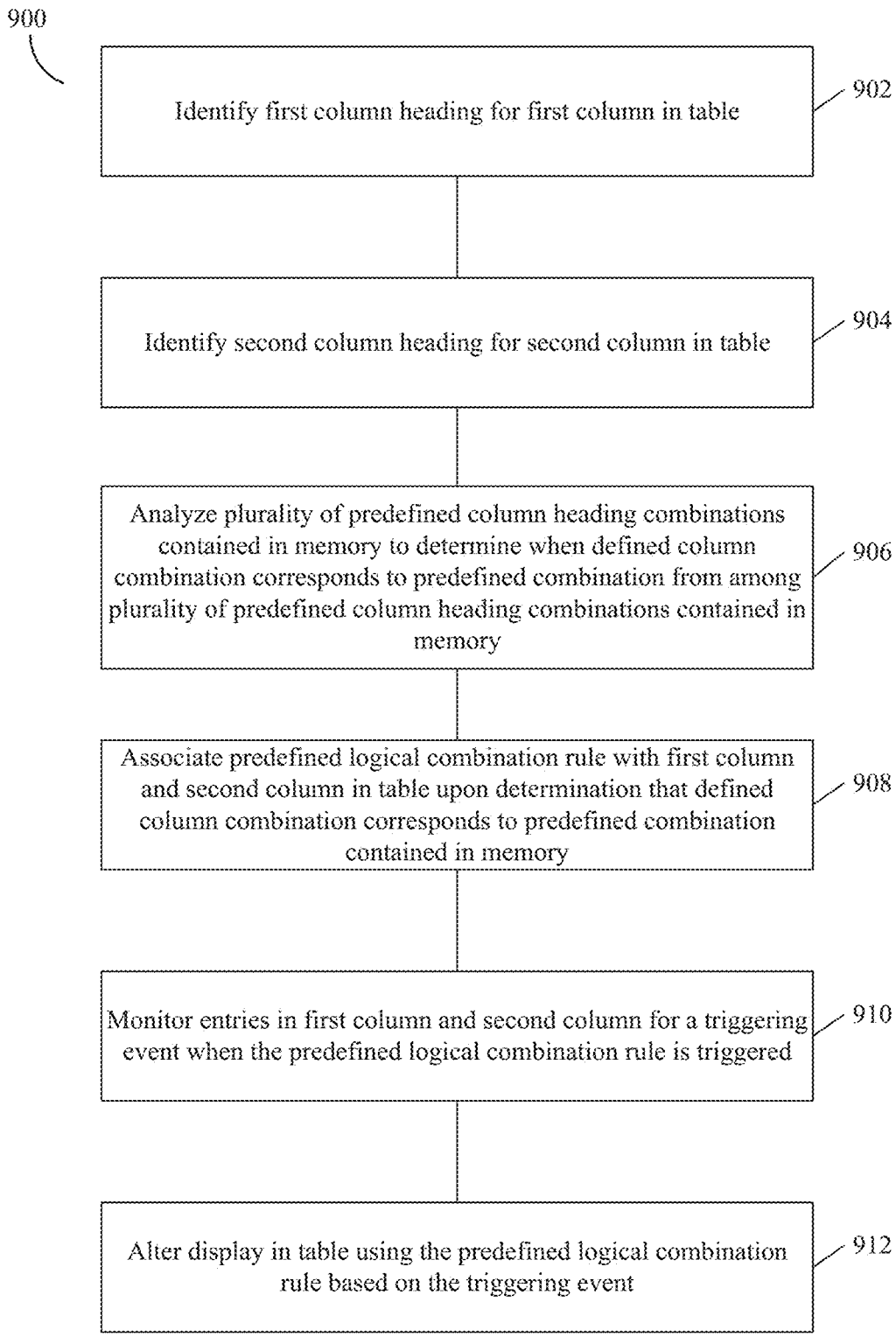
FIG. 9 is a block diagram of an exemplary process for relationship recognition in tablature, consistent with embodiments of the present disclosure.

By way of example, FIG. 9 illustrates a block diagram of an example process 900 for altering tablature displays, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 900 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 3A to 7B by way of example. In some embodiments, some aspects of the process 900 may be implemented as software (e.g., program codes or instructions) that is stored in a memory (e.g., the memory 120 in FIG. 1) or a non-transitory computer-readable medium. In some embodiments, some aspects of the process 900 may be implemented as hardware (e.g., a specific-purpose circuit). In some embodiments, the process 900 may be implemented as a combination of software and hardware.

FIG. 9 includes steps 902 to 912. At the step 902, a processor (e.g., the processing circuitry 110 in FIG. 1) may identify a first column heading (e.g., the first column heading 304 in FIG. 3A) for a first column (e.g., the first column 302 in FIG. 3A) in a table (e.g., the table 300A in FIG. 3A) in response to a user (e.g., an individual or a portion of the general public) select.

At the step 904, the processor may identify a second column heading (e.g., the second column heading 308 in FIG. 3A) for a second column (e.g., the second column 306 in FIG. 3A) in the table in response to a user selection.

At the step 906, the processor may analyze a plurality of predefined column heading combinations contained in a memory (e.g., the memory 120 in FIG. 1) to determine when the defined column combination corresponds to a predefined combination from among the plurality of predefined column heading combinations contained in the memory.

At the step 908, the processor may associate a predefined logical combination rule with the first column and the second column in the table upon determination that the defined column combination corresponds to a predefined combination contained in the memory. In some embodiments, the predefined logical combination rule may be configured to trigger a display change (e.g., as illustrated in FIGS. 5A to 7B) in the table in response to two differing value entries (e.g., the value entries of the cells in the first column 302 and of the cells in the second column 306 in FIG. 3A) in two differing columns (e.g., the first column and the second column).

At the step 910, the processor may monitor entries (e.g., data associated with texts "in progress," "waiting," and "done" in FIG. 3A) in the first column and the second column for a triggering event when the predefined logical combination rule is triggered.

At the step 912, the processor may alter a display (e.g., as illustrated in FIGS. 5A to 7B) in the table when the predefined logical combination rule is triggered. In some embodiments, the processor is enabled to alter (e.g., by way of the operations described in association with FIGS. 3A to 4B) the predefined logical combination rule between the first and second columns. In some embodiments, after creation of the predefined logical combination rule, the predefined logical combination rule is enabled to be cancelled.

In some embodiments, the processor may alter the display in the table by establishing a third column (e.g., the third column 502 in FIGS. 5B and 5C) for storing data (e.g., the symbols included in the third column 502) associated with a trigger (e.g., that "a task is overdue" as described herein) of the predefined logical combination rule. In some embodiments, the processor may alter the display in the table by displaying an aggregation (e.g., the aggregation 602 in FIG. 6) of entries in the first column and the second column where the predefined logical combination rule is triggered. For example, the processor may display the aggregation in the manners as described in association with FIG. 6.

In some embodiments, at the step 912, the processor may alter the display in the table by altering a display of the second column (e.g., the second column 306 in FIG. 3A). For example, the processor may add a visual object to the second column, change a visual effect of a visual object in the table, or both, as described in association with FIGS. 5A to 5C. In some embodiments, the processor may alter the display in the table by altering a display of the first column and a display of the second column, such as by way of the example operations described in association with FIGS. 5B and 5C. In some embodiments, the processor may alter the display of the first column and the display of the second column by presenting an indication that the first column and the second column are linked, such as by way of the example operations described in association with FIGS. 7A and 7B. In some embodiments, the indication may include an icon (e.g., the first icon 702, the second icon 704, or both).

Consistent with embodiments of the present disclosure, the processor may perform further operations (e.g., the operations as described in association with FIGS. 7A and 7B) after presenting an indication that the first column and the second column are linked. The processor may enable replacement (e.g., by way of changing contents, values, formats, or datatypes thereof) the first column heading (e.g., the first column heading 304 in FIGS. 7A to 7B) for the first column (e.g., the first column 302 in FIGS. 7A to 7B) with an updated column heading for the first column in response to a user input (e.g., by way of a menu). The processor may also analyze, in a way similar to step 906, a plurality of predefined column heading combinations contained in the memory to determine when the updated defined column combination corresponds to a predefined column heading combination from among the plurality of predefined column heading combinations contained in the memory. The processor may further disassociate (e.g., decoupling or removing a relationship between) the predefined logical combination rule with the first column and the second column in the table upon determination that the updated combination does not correspond to any predefined combination contained in the memory. The processor may further alter the display in the table, in which the altering the display in the table may include unlinking the first column and the second column. For example, the processor may unlink the first column and the second column by removing the indication (e.g., as illustrated and described in FIGS. 7A and 7B) that the first column and the second column are linked.

Consistent with embodiments of the present disclosure, the processor may further send a notification (an email, a text message, a phone call, an application push notification, or any combination of any form of notifications) when the predefined logical combination rule is triggered. For example, the processor may send the notification after performing the step 912.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

What is claimed is:

1. A system for relationship recognition in tablature, the system comprising:
   at least one processor configured to:
   identify a first column heading selection for a first column in a table and identify a second column heading selection for a second column in the table;
   define a particular column combination based on the identified first column heading selection and the identified second column heading selection;
   analyze a plurality of predefined column heading combinations contained in a memory to determine when the particular column combination corresponds to a predefined column heading combination from among the plurality of predefined column heading combinations contained in the memory;
   determine that the particular column combination corresponds to the predefined column heading combination based on at least one of a determination that the particular column combination shares data with the predefined column heading combination or a determination that the particular column combination shares a datatype with the predefined column heading combination;
   associate a predefined logical combination rule with the first column and the second column in the table based on a determination that the particular column combination corresponds to the predefined column heading combination;
   monitor entries in the first column and the second column to determine when the predefined logical combination rule is met; and
   when the predefined logical combination rule is determined to be met, trigger an operation, wherein the operation includes altering a display in the table.

2. The system of claim 1, wherein altering the display in the table includes automatically establishing a third column for storing data associated with a trigger of the predefined logical combination rule.

3. The system of claim 1, wherein altering the display in the table includes altering a display of the second column.

4. The system of claim 1, wherein the at least one processor is further configured to:
   enable replacement of the identified first column heading for the first column with an updated column heading for the first column;
   define an updated column combination based on the updated column heading and the identified second column heading selection;
   analyze the plurality of predefined column heading combinations contained in the memory to determine when the updated particular column combination corresponds to a predefined column heading combination from among the plurality of predefined column heading combinations contained in the memory;
   disassociate the predefined logical combination rule with the first column and the second column in the table upon determination that the updated particular column combination does not correspond to any predefined combination contained in the memory; and
   further alter the display in the table, wherein further altering the display in the table includes unlinking the first column and the second column.

5. The system of claim 1, wherein the at least one processor is further configured to:
   identify a third column heading selection for a third column in the table; and
   define the particular column combination based on the identified first column heading selection, the identified second column heading selection, and the identified third column heading selection.

6. The system of claim 1, wherein associating the predefined logical combination rule with the first column and the second column includes creating a link between the first column and the second column.

7. The system of claim 1, wherein the predefined logical combination rule is configured to trigger the operation in response to data associated with the first column and the second column.

8. A non-transitory computer readable medium containing instructions that when executed by at least one processor, cause the at least one processor to perform operations for automatic relationship recognition in tables of collaborative systems, the operations comprising:
   identifying a first column heading selection for a first column in a table and identifying a second column heading selection for a second column in the table;
   defining a particular column combination based on the identified first column heading selection and the identified second column heading selection;
   analyzing a plurality of predefined column heading combinations contained in a memory to determine when the particular column combination corresponds to a predefined column heading combination from among the plurality of predefined column heading combinations contained in the memory;

determining that the particular column combination corresponds to the predefined column heading combination based on at least one of a determination that the particular column combination shares data with the predefined column heading combination or a determination that the particular column combination shares a datatype with the predefined column heading combination;

associating a predefined logical combination rule with the first column and the second column in the table based on a determination that the particular column combination corresponds to the predefined column heading combination;

monitoring entries in the first column and the second column to determine when the predefined logical combination rule is met; and when the predefined logical combination rule is determined to be met, triggering an operation, wherein the operation includes altering a display in the table.

9. The non-transitory computer readable medium of claim 8, wherein the predefined logical combination rule is configured to trigger a display change in the table in response to two differing value entries in two differing columns.

10. The non-transitory computer readable medium of claim 8, wherein the predefined logical combination rule between the first column and the second column is enabled to be altered.

11. The non-transitory computer readable medium of claim 10, wherein after creation of the predefined logical combination rule, the predefined logical combination rule is enabled to be cancelled.

12. The non-transitory computer readable medium of claim 8, wherein altering the display in the table includes establishing a third column for storing data associated with a trigger of the predefined logical combination rule.

13. The non-transitory computer readable medium of claim 8, wherein altering the display in the table includes altering a display of the second column.

14. The non-transitory computer readable medium of claim 8, wherein altering the display in the table includes altering a display of the first column and a display of the second column.

15. The non-transitory computer readable medium of claim 14, wherein altering the display of the first column and the display of the second column includes presenting an indication that the first column and the second column are linked.

16. The non-transitory computer readable medium of claim 15, wherein the operations further comprise enabling replacement of the identified first column heading for the first column with an updated column heading for the first column;

defining an updated column combination based on the updated column heading and the identified second column heading selection;

analyzing the plurality of predefined column heading combinations contained in the memory to determine when the updated particular column combination corresponds to a predefined column heading combination from among the plurality of predefined column heading combinations contained in the memory;

disassociating the predefined logical combination rule with the first column and the second column in the table upon determination that the updated particular column combination does not correspond to any predefined combination contained in the memory; and further altering the display in the table, wherein further altering the display in the table includes unlinking the first column and the second column.

17. The non-transitory computer readable medium of claim 15, wherein the indication is an icon.

18. The non-transitory computer readable medium of claim 8, wherein the operations further comprise sending a notification when the predefined logical combination rule is triggered.

19. A method for relationship recognition in tablature, the method comprising identifying a first column heading selection for a first column in a table and identifying a second column heading selection for a second column in the table;

defining a particular column combination based on the identified first column heading selection and the identified second column heading selection;

analyzing a plurality of predefined column heading combinations contained in a memory to determine when the particular column combination corresponds to a predefined column heading combination from among the plurality of predefined column heading combinations contained in the memory;

determining that the particular column combination corresponds to the predefined column heading combination based on at least one of a determination that the particular column combination shares data with the predefined column heading combination or a determination that the particular column combination shares a datatype with the predefined column heading combination;

associating a predefined logical combination rule with the first column and the second column in the table based on a determination that the particular column combination corresponds to the predefined column heading combination;

monitoring entries in the first column and the second column to determine when the predefined logical combination rule is met; and when the predefined logical combination rule is determined to be met, triggering an operation, wherein the operation includes altering a display in the table.

20. The method of claim 19, wherein altering the display in the table includes establishing a third column for storing data associated with a trigger of the predefined logical combination rule.

21. The method of claim 19, wherein altering the display in the table includes altering a display of the second column.

22. The method of claim 19, further comprising:

enabling replacement of the identified first column heading for the first column with an updated column heading for the first column;

defining an updated column combination based on the updated column heading and the identified second column heading selection;

analyzing the plurality of predefined column heading combinations contained in the memory to determine when the updated particular column combination corresponds to a predefined column heading combination from among the plurality of predefined column heading combinations contained in the memory;

disassociating the predefined logical combination rule with the first column and the second column in the table upon determination that the updated particular column combination does not correspond to any predefined combination contained in the memory; and further altering the display in the table, wherein further altering the display in the table includes unlinking the first column and the second column.

23. The method of claim 19, wherein the method further comprises sending a notification when the predefined logical combination rule is triggered.

* * * * *